United States Patent
Chang et al.

(10) Patent No.: US 6,856,788 B2
(45) Date of Patent: Feb. 15, 2005

(54) WIRELESS IC INTERCONNECTION METHOD AND SYSTEM

(75) Inventors: Mau-Chung F. Chang, Los Angeles, CA (US); Tatsuo Itoh, Los Angeles, CA (US); Yongxi Qian, Los Angeles, CA (US); Kang L. Wang, Santa Monica, CA (US)

(73) Assignee: Mastek International, Los Angeles, CA (US)

( * ) Notice: Subject to any disclaimer, the term of this patent is extended or adjusted under 35 U.S.C. 154(b) by 671 days.

(21) Appl. No.: 09/839,107

(22) Filed: Apr. 20, 2001

(65) Prior Publication Data

US 2002/0183003 A1 Dec. 5, 2002

(51) Int. Cl.[7] .................................................. H04B 5/00
(52) U.S. Cl. ..................... 455/41.1; 455/41.2; 455/66.1
(58) Field of Search ............................... 455/66.1, 41.1, 455/41.2, 39; 361/736

(56) References Cited

U.S. PATENT DOCUMENTS

| | | | | |
|---|---|---|---|---|
| 4,763,340 | A | * 8/1988 | Yoneda et al. | 375/377 |
| 5,621,913 | A | * 4/1997 | Tuttle et al. | 455/41.2 |
| 6,006,112 | A | * 12/1999 | Rucki et al. | 455/561 |
| 6,542,050 | B1 | * 4/2003 | Arai et al. | 333/134 |
| 6,542,720 | B1 | * 4/2003 | Tandy | 257/725 |
| 6,546,044 | B1 | * 4/2003 | Dent | 375/216 |
| 6,646,525 | B2 | * 11/2003 | Bozler et al. | 333/246 |
| 2002/0051435 | A1 | * 5/2002 | Giallorenzi et al. | 370/335 |

OTHER PUBLICATIONS

Andrew J. Viterbi, *Principles of Spread Spectrum Communication, CDMA*, Addison Wesley Longman, Inc. (1995), pp. 1–9.

Behzad Razavi, *RF MICROELECTONICS*, Prentice Hall PTR (1998), pp. 105–111.

* cited by examiner

*Primary Examiner*—Nguyen T. Vo
*Assistant Examiner*—A. Behulu
(74) *Attorney, Agent, or Firm*—Koppel, Jacobs, Patrick & Heybl (57) ABSTRACT

A wireless IC interconnect system and method facilitates interconnections between first and second IC locations via a wireless transmission medium; the IC locations may be on the same chip or on separate chips. A signal to be conveyed is modulated, and the modulated signal is capacitively coupled to the wireless transmission medium—preferably a properly terminated microstrip transmission line (MTL) or a coplanar waveguide (CPW). The modulated signal is capacitively coupled from the wireless medium to a receiver which demodulates the modulated signal and provides the demodulated signal to the second IC location. In a preferred embodiment, the wireless transmission system conveys numerous signals simultaneously, with the signals modulated and demodulated with multiple access algorithms such as code-division (CDMA) and/or frequency-division (FDMA) multiple access algorithms. The interconnection system can be made reconfigurable, with the destinations of the modulated signals changed by reprogramming associated address codes.

32 Claims, 7 Drawing Sheets

WIRELESS IC INTERCONNECTION METHOD AND SYSTEM

BACKGROUND OF THE INVENTION

1. Field of the Invention

This invention relates to the field of integrated circuit (IC) interconnections, and particularly to wireless systems and methods of effecting inter- and intra-chip interconnections.

2. Description of the Related Art

For the past three decades, the performance of ICs has depended primarily on device properties. To enhance circuit and system performance, considerable effort has been expended on improving device speed by reducing the device dimensions. This decrease in minimum feature size has led to a proportional decrease in the cross-sectional area and pitch of metal interconnects ("wires"). As a result, the parasitic resistance, capacitance and inductance associated with an IC's wires are beginning to adversely affect circuit performance, and have increasingly become a primary stumbling block in the evolution of deep sub-micron ultra-LSI (ULSI) technology. Recent studies have indicated that when feature sizes fall below 1 $\mu$m, the interconnect parasitics cause signal attenuation and dispersion in the wires, seriously hurting circuit and system performance. These problems become even more acute when the bit rate capacity exceeds ~$10^{16}$ A/l$^2$, where A is the cross sectional area of the interconnect wiring and l is the length of the wire. The RC (or LC) time delay, IR voltage drop, CV$^2$f power loss and crosstalk parameters of an IC's wires also become significant at higher bit rates.

For the past few years, a great deal of work has been focused on improving conventional interconnect technology by reducing the resistivity of conductors (using copper, for example) and reducing the dielectric constant of interlayer dielectric materials (by using low-K polymers, for example). Nevertheless, these evolutionary approaches may soon encounter fundamental material limits which will inhibit further feature size reductions and/or bit rate increases.

SUMMARY OF THE INVENTION

A wireless IC interconnect system and method are presented which overcome the problems noted above. Because the present interconnection scheme is wireless, the bit rate and feature size limitations associated with conventional metal interconnects are largely eliminated.

In accordance with the present invention, interconnections are made between first and second IC locations via a wireless transmission medium. A signal to be conveyed from a first IC location to a second IC location is modulated, and the modulated signal is capacitively coupled to the wireless transmission medium. The modulated signal propagates through the wireless transmission medium, and is capacitively coupled to a receiver which demodulates the modulated signal and delivers the demodulated signal to the second IC location. The wireless medium is preferably either a microstrip transmission line (MTL) or a coplanar waveguide (CPW), which is preferably terminated at both ends with an impedance equal to the medium's characteristic impedance $Z_C$. The first and second IC locations may be on the same die or separate dies, such that either intra-chip or inter-chip interconnections are facilitated.

In a preferred embodiment, the wireless transmission medium conveys numerous signals simultaneously, each of which is modulated and capacitively coupled into the medium, propagated, and then capacitively coupled out of the medium, demodulated, and fed to their respective destinations. The signals are preferably modulated and demodulated with multiple access algorithms, such as code-division (CDMA) and/or frequency-division (FDMA) multiple access algorithms, which provide a means of distinguishing between the simultaneously propagating signals. When using a CDMA algorithm, each of the modulated signals can be assigned an associated orthogonal address code. The interconnection system is made reconfigurable by making these codes programmable, such that the destinations of the modulated signals are changed by simply reprogramming the address codes.

Further features and advantages of the invention will be apparent to those skilled in the art from the following detailed description, taken together with the accompanying drawings.

DETAILED DESCRIPTION OF THE INVENTION

Figure 1A:
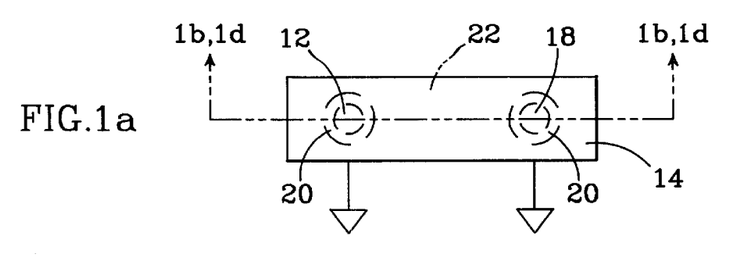
FIGS. 1a and 1b are plan and corresponding cross-sectional views, respectively, of a wireless interconnection system per the present invention.
Figure 1B:
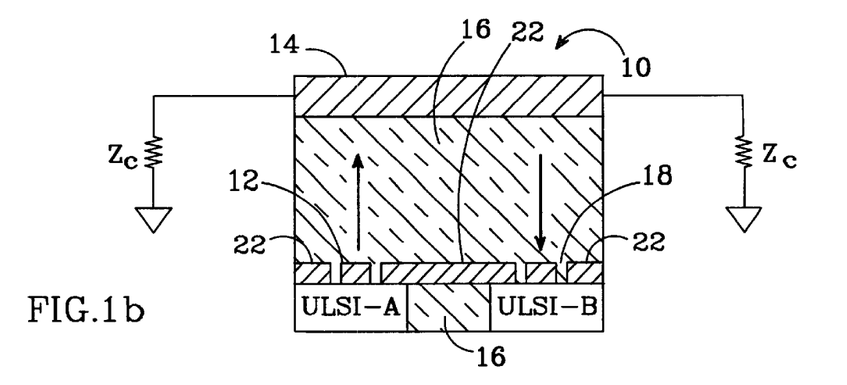

The basic principles of a wireless interconnection system in accordance with the present invention are shown in FIGS. 1a and 1b, which show plan and corresponding cross-sectional views of a package 10 which employs the present invention. The package includes two integrated circuits ULSI-A and ULSI-B which require interconnection. In this example, ULSI-A produces a signal which must be conveyed to ULSI-B. Conventionally, such a signal would be conveyed via a metal interconnect or a wire bond. Here, however, the signal is conveyed wirelessly. The signal from ULSI-A is modulated and routed to a first capacitive coupler 12, which capacitively couples the signal to a wireless transmission medium 14. The wireless transmission medium is physically separated from the ICs, and the ICs separated from each other, with a dielectric filler material 16.

The capacitively coupled signal propagates through wireless transmission medium 14. A second capacitive coupler 18 couples the propagating signal from medium 14 to a receiver, which demodulates the signal and delivers it to its destination on ULSI-B. In this way, the invention provides a wireless interconnection between ULSI-A and ULSI-B, thereby avoiding the inherent limitations presented by a wired connection.

With appropriate designs, RF/microwave signals can be transmitted efficiently through either free space or guided mediums. Free space signal broadcasting/receiving is common practice in modern wireless systems, due to its excellent channeling capability and low cost implementation. However, the efficient transmission and reception of RF/microwave signals in free space requires the size of the antenna to be comparable to the signals' wavelengths. As operating speeds approach and exceed 100 GHz, the optimal aperture size of the antenna needs to be on the order of 1 mm$^2$, which is too large to be comfortably implemented in current and future ULSI packages.

The invention overcomes these problems by employing capacitive couplers to couple signals to and from a guided medium. Instead of using a sizable "far field" antenna to broadcast signals, as discussed above, the invention uses smaller "near field" capacitive couplers, which perform adequately over relatively short distances (several centimeters or less). The use of capacitive couplers in an enclosed package also avoids the need to comply with FCC regulations regarding RF communications. Capacitive couplers 12 and 18 are surrounded with respective isolation gaps 20, and a grounded metal shield 22.

A guided medium, such as a microstrip transmission line (MTL) or coplanar-wave-guide (CPW), is known to have low attenuation up to at least 200 GHz. For example, simulations indicate that signals transmitted through a 1 cm long CPW experience extremely low loss (~−1.6 dB at 100 GHz) and low frequency dispersion (<~2 dB) across the complete frequency range of simulation (50–150 GHz). Conventional metal interconnects, on the other hand, exhibit large losses: up to −60 dB and −115 dB per centimeter at 100 GHz for 1 μm and 0.1 μm wide interconnect lines, respectively. The frequency dispersion of these interconnects also reaches 30–40 dB across the same frequency range. Clearly, conventional metal lines with narrow geometries may be inadequate for global interconnect applications in current and future high speed ICs. The performance afforded by the present invention, however, meets or exceeds such requirements.

As noted above, wireless transmission medium 14 is preferably a guided medium such as a MTL or CPW. The center/top conductor of the CPW/MTL is typically 10–100 μm wide, depending on its characteristic impedance $Z_C$ (typically 25–100Ω) and other signal transmission requirements. To accommodate its size, a CPW or MTL can be used as an "off-chip" but "in-package" transmission medium and shared by multiple ULSI I/Os. Alternatively, medium 14 may be fabricated as an integral part of an IC. A CPW requires that the conductor and ground to be in the same plane, while a MTL does not. For this reason, MTLs are preferred, particularly if multiple microstrips are to be run.

Figure 1C:
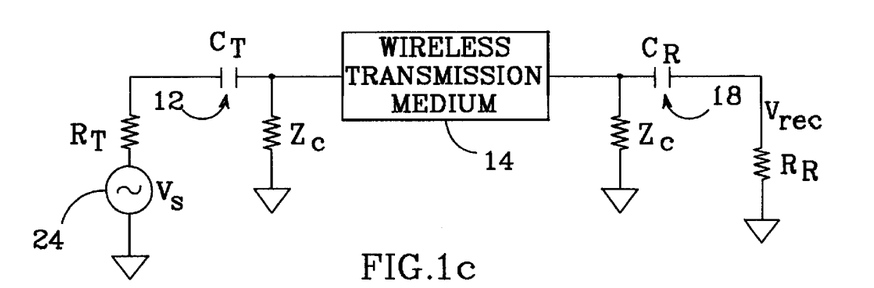
FIG. 1c is an equivalent circuit schematic for a representative transmitter-receiver loop per the present invention.

An equivalent circuit of the invention as used to convey a single signal is shown in FIG. 1c. A signal source 24 provides a signal to a transmitter having an output resistance $R_T$, which modulates the signal and delivers it to a capacitive coupler 12 having a capacitance $C_T$, which couples the modulated signal into wireless transmission medium 14. The signal propagates through medium 14, and is coupled from the medium by a capacitive coupler 18 having a capacitance $C_R$ to a receiver having an input resistance $R_R$, which demodulates the signal and delivers it to its destination. As noted above, medium 14 is terminated at both ends by its characteristic impedance $Z_C$.

When so arranged, the voltage $V_{rec}$ received at the receiver is given by:

$$V_{rec} = \frac{\frac{Z_C}{2} R_R}{\left(\frac{Z_C}{2} + R_T - j\frac{1}{\omega C_T}\right)\left(\frac{Z_C}{2} + R_R - j\frac{1}{\omega C_R}\right)} V_S \exp(-j\beta d) \quad (1)$$

where $V_S$ is the source signal voltage and d is the distance between the transmitter and receiver. It is clear from Eq. (1) that $R_T$ and $R_R$ should be much greater than $Z_C$ to preserve the wireless medium's characteristic impedance, and that $$R_R \gg j\frac{1}{\omega C_R} \text{ and } R_T \gg j\frac{1}{\omega C_T}$$

to obtain a dispersion-free $V_{rec}$.

Figure 1D:
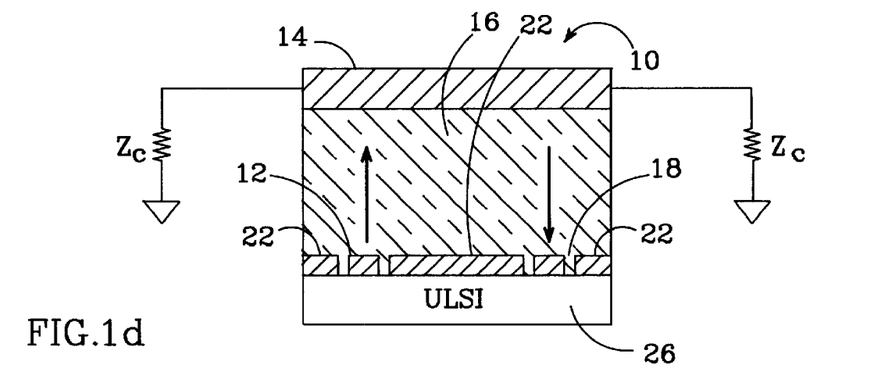
FIG. 1d is a cross-sectional view corresponding with the plan view of FIG. 1a which shows the invention providing an intra-chip interconnection.

In FIG. 1b, the invention is depicted as furnishing an interconnection between two separate ICs, thereby providing an inter-chip interconnection. As shown in FIG. 1d, the invention may also be used to provide intra-chip interconnections, wherein a signal is conveyed between two locations on a common IC die 26.

Figure 2A:
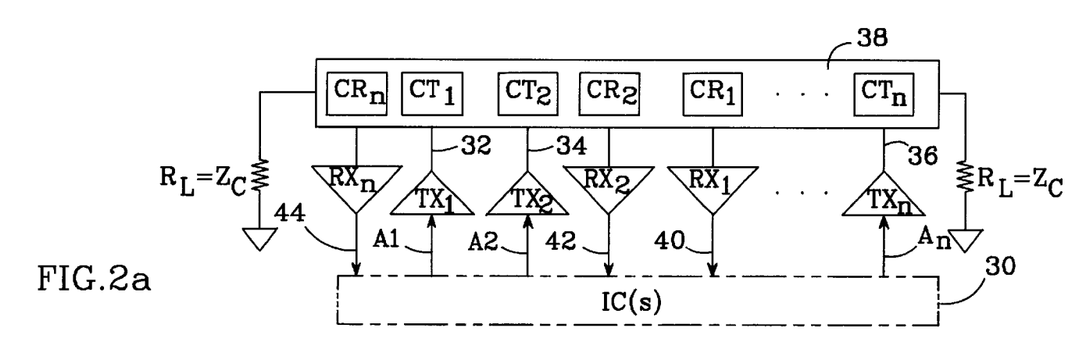
FIG. 2a is a diagram illustrating the use of the present wireless interconnection system to convey multiple signals simultaneously.

While suitable for providing a single interconnection as shown in FIGS. 1a–1d, the invention is preferably used to provide multiple interconnections via a common wireless medium. A diagram illustrating this arrangement is shown in FIG. 2a. One or more ICs 30 generate signals $A_1, A_2, \ldots, A_n$, which need to be conveyed from respective first IC locations to respective second IC locations. Each of signals $A_1, A_2, \ldots, A_n$ are connected to respective transmitters $TX_1, TX_2, \ldots, TX_n$, which modulate them and provide the modulated signals (32, 34 and 36) to respective capacitive couplers $CT_1, CT_2, \ldots, CT_n$. Each of the capacitive couplers couples its respective modulated signal into a wireless transmission medium 38, which is preferably terminated at both ends with its characteristic impedance $Z_C$. All of the coupled signals propagate simultaneously through medium 38.

The wireless interconnection system also includes receivers $RX_1, RX_2, \ldots, RX_n$ connected to respective capacitive couplers $CR_1, CR_2, \ldots, CR_n$, which couple the modulated signals to their respective receivers. The receivers demodulate the signals and deliver the demodulated signals (40, 42, 44) to their respective destinations.

In this way, the invention facilitates multiple interconnections with a common wireless transmission medium. Simulations indicate that such a single shared transmission line can support at least 20 transmitter/receiver (TX/RX) pairs with low losses. For example, assume $TX_n$ and $RX_n$ are placed at opposite ends of medium 38, and 19 other TX/RX pairs are spaced uniformly across the medium. Further assume that $R_T = R_R = 5 \text{ k}\Omega = 100 \ast Z_C$, and $$\frac{1}{\omega C_T} = \frac{1}{\omega C_R} = 0.1 R_T.$$

Simulations indicate that the signal loss caused by shunting 20/20 TX/RX in this way is about 0.3 dB/cm. The loss is still as low as 0.8 dB/cm when $R_T$ and $R_R$ are reduced to 2 kΩ.

Larger $C_T$ and $C_R$ values improve the capacitive coupling between a system's transceivers and the transmission medium. However, the size of $C_T$ and $C_R$ are preferably made small enough to be compatible with the processes used to fabricate the source and destination ICs. A good compromise is provided by choosing $R_T=R_R=2$ k$\Omega$ and $$\frac{1}{\omega C_T} = \frac{1}{\omega C_R} < 0.1 R_T.$$

When operating at 100 GHz, the required $C_T$ or $C_R$ capacitance is estimated to be larger than 8.3 fF. Assuming the vertical coupling distance is 25 $\mu$m and using ZrO ($\epsilon_r>10$) as the dielectric between coupler electrodes, the pad size of $C_T$ or $C_R$ is calculated to be <600 $\mu$m$^2$. Capacitive couplers of this size can be easily implemented in present and future ULSI designs.

Assuming a CMOS transmitter output stage which is operated in class A and biased at $V_{dd}=1.8$ volt, the signal power received at the farthest $RX_n$ is calculated as $P_{rec}=-[39+10 \text{ Log}(L)]$ dBm according to the formula:

$$P_{rec}=LV^2_{dd}Z_C^2/(8R_R R_T^2) \quad (2)$$

where L accounts for the medium's attenuation. Since the signal is virtually dispersion-free, it can be boosted to an adequate power level at the receiver by CMOS pre-amplifiers for subsequent signal/data processing. System noise floor and receiver sensitivity should be analyzed to ensure the adequacy of $P_{rec}$ if low bit error rate (BER) communications must be supported.

Figure 2B:
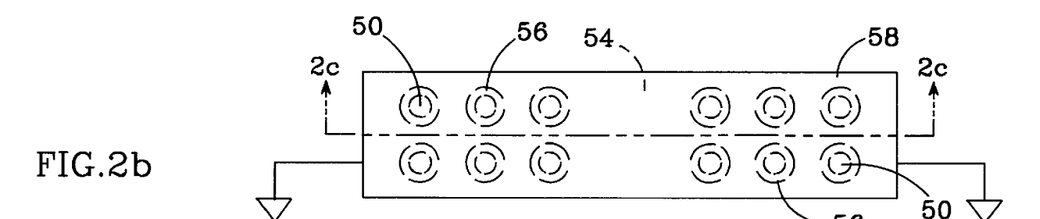
FIGS. 2b and 2c are plan and corresponding cross-sectional views, respectively, of a preferred embodiment of the present wireless interconnection system.
Figure 2C:
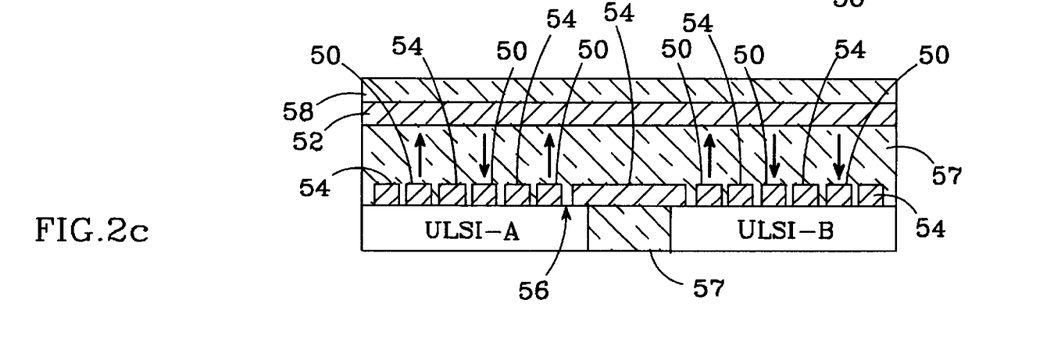

FIGS. 2b and 2c depict plan and corresponding cross-sectional views, respectively, of an exemplary wireless interconnection system arranged to convey multiple signals simultaneously. Each of two ICs, ULSI-A and ULSI-B, include multiple capacitive couplers 50, which couple respective signals between the ICs and a wireless transmission medium 52. As before, the capacitive couplers are surrounded with a grounded metal shield 54, with isolation gaps 56 between the couplers and the metal. A dielectric filler material 57 fills the space between the ICs and medium 52, and the package preferably includes an insulating layer 58 above transmission medium 52.

The signals must be modulated prior to being capacitively coupled to the transmission medium. The modulation can be done with either a digital or analog carrier. As multiple signals propagate simultaneously within the transmission medium, the modulation scheme must provide a means of distinguishing between the propagating signals when received. This is preferably accomplished by modulating the signals using multiple-access algorithms, such as FDMA and CDMA algorithms.

Figure 3:
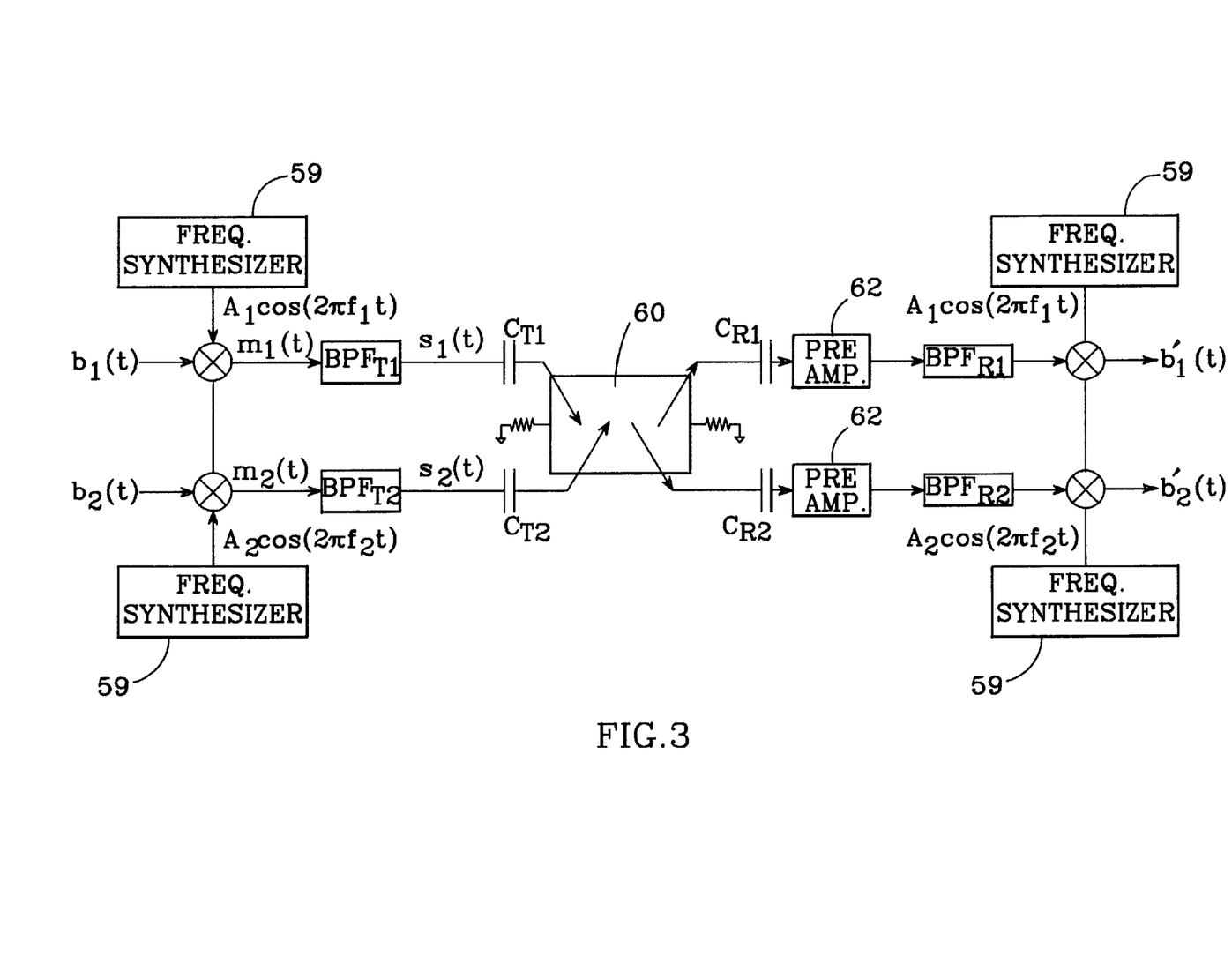
FIG. 3 is a diagram of a wireless interconnection system which utilizes a FDMA algorithm.

When using a FDMA algorithm, the system's bandwidth is divided into separate frequency bands, each of which carries one or more signals. For example, for a system with a total bandwidth of 105 GHz, frequency bands of I/O channels may be allocated between 5–105 GHz with bandwidths of 5~20 GHz for each channel, thereby providing a minimum data rate of 5~40 Gbps, depending on the modulation scheme. An exemplary system which employs FDMA modulation and demodulation for two signals is shown in FIG. 3. Two signals to be conveyed, $b_1(t)$ and $b_2(t)$, are multiplied by sinusoidal carriers such as $A_1 \cos(2\pi f_1 t)$ and $A_2 \cos(2\pi f_2 t)$, respectively, where $A_1$ and $A_2$ are the amplitudes and $f_1$ and $f_2$ are the frequencies of the respective carriers; the carriers may be generated, for example, by one or more frequency synthesizers 59. The resulting signals $m_1(t)$ and $m_2(t)$ are filtered through bandpass filters $BPF_{T1}$ and $BPF_{T2}$—which have unique passbands—to form functions $s_1(t)$ and $s_2(t)$. The FDMA-modulated signals are eventually coupled into a shared wireless transmission medium 60 (preferably terminated at both ends as described above) via capacitive couplers $C_{T1}$ and $C_{T2}$.

On the receiver side, the process is reversed. Capacitive couplers $C_{R1}$ and $C_{R2}$ couple the modulated signals from medium 60 to the receivers, which can include preamplifiers 62 and respective bandpass filters $BPF_{R1}$ and $BPF_{R2}$. The filtered signals are demodulated by mixing them with the modulating carriers, thereby reconstructing input signals $b_1(t)$ and $b_2(t)$, labeled here as $b_1'(t)$ and $b_2'(t)$.

Preamplifiers 62 preferably have gains on the order of 20–30 dB. Balanced or double balanced active mixers, such as Gilbert cells, may be used for modulation and demodulation. It is advantageous to use a non-coherent detection scheme, such as frequency shift keying (FSK), for simple receiver implementation.

Figure 4:
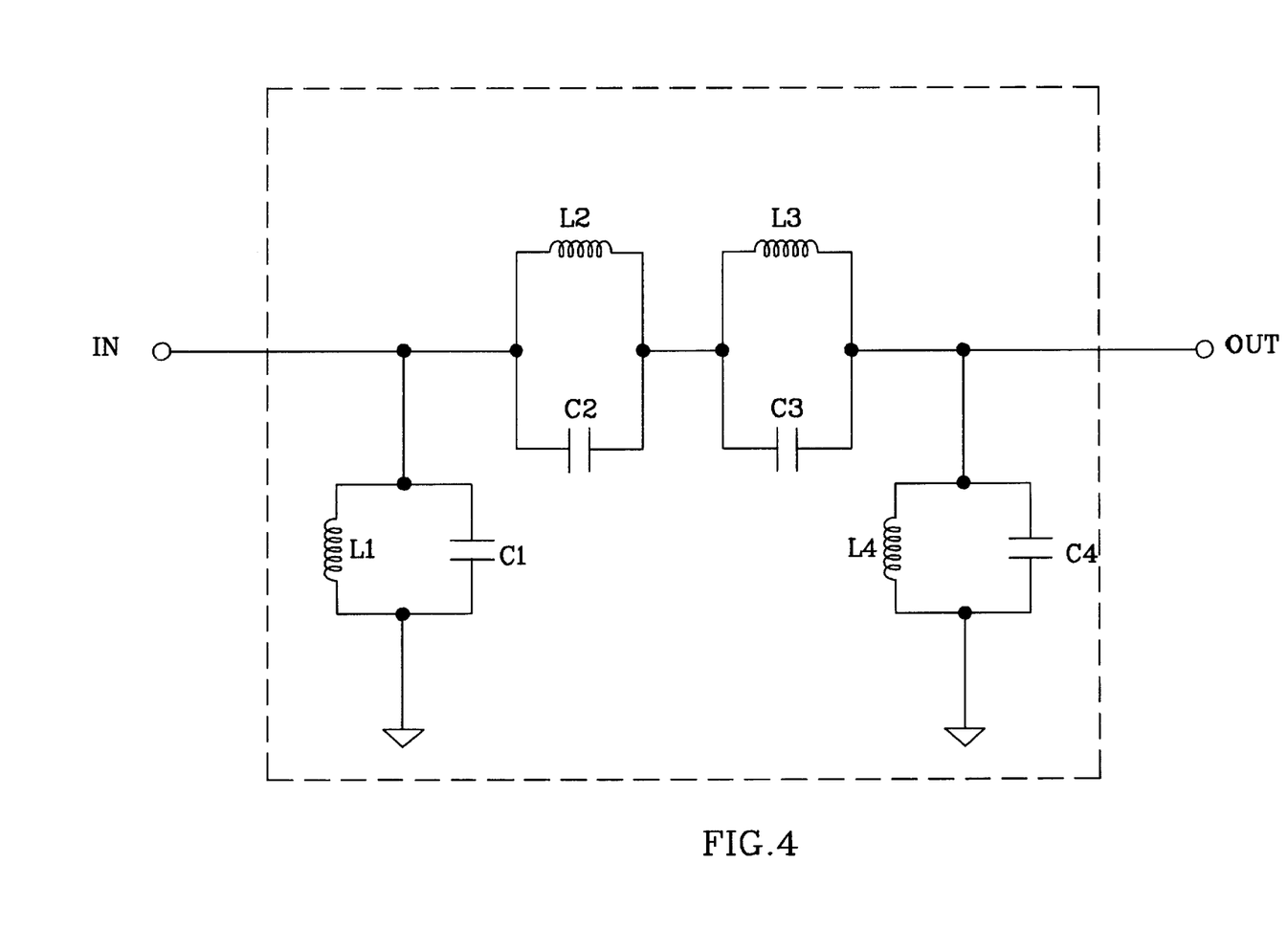
FIG. 4 is a schematic diagram of an embodiment of a bandpass filter suitable for use with the system of FIG. 3.

Bandpass filters $BPF_{T1,T2,R1,R2}$ are needed to minimize cross-band interference, and are preferably low-loss and highly-selective filters. One filter which meets these criteria uses a transformer-type inductor design, in which the lost energy is recovered via a secondary inductor with delayed phase angles to attain extremely high Q (>1000) inductance and high tunability (0–100%). A elliptical filter based on this technique is shown in FIG. 4. Simulations indicate that, using exemplary component values as follows:

L1=0.41 nH, Q=50; C1=2.6 pF L2=0.39 nH, Q=50; C2=1.5 pF

L3=0.72 nH, Q=50; C3=2.7 pF L4=0.41 nH, Q=50; C4=2.6 pF provides a 5 GHz filter with a 2 GHz bandwidth, a 1 dB passband insertion loss, and 22 dB stopband rejection.

FDMA algorithms are well-known; they are described in, for example, Razavi, *RF Microelectronics*, Prentice-Hall (1998), pp. 105–110.

Figure 5:
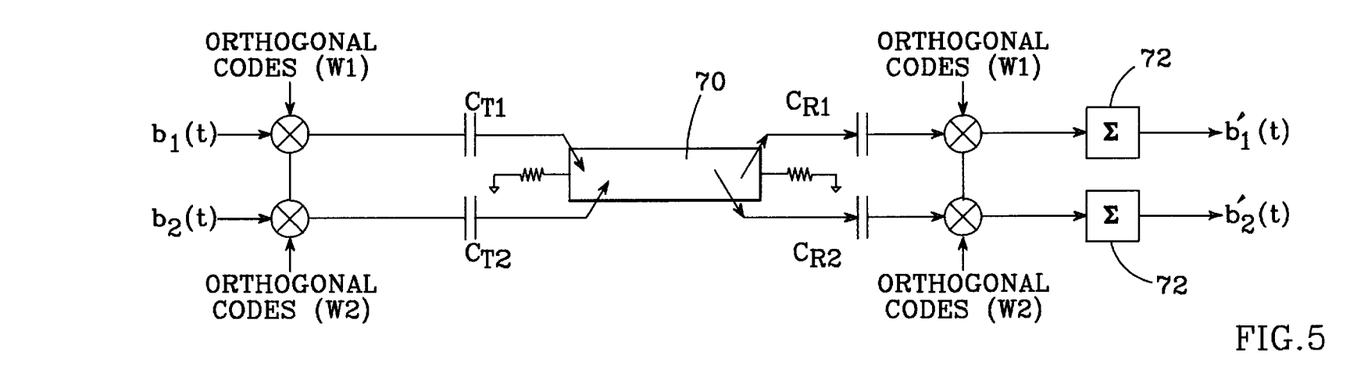
FIG. 5 is a diagram of a wireless interconnection system which utilizes a CDMA algorithm.

An exemplary system which employs CDMA modulation and demodulation for two signals is shown in FIG. 5. Two signals to be conveyed, $b_1(t)$ and $b_2(t)$, are first spread by orthogonal codes, such as Walsh codes (W1 and W2). The modulated signals are capacitively coupled into a properly terminated shared wireless transmission medium 70 with capacitive couplers $C_{T1}$ and $C_{T2}$, where they are linearly superposed and broadcasted to receivers. Capacitive couplers $C_{R1}$ and $C_{R2}$ at the receiver end couple the signals from medium 70 to mixers which de-spread the signals using the same orthogonal codes (W1 and W2); the de-spread signals are passed through respective correlators 72 to recover $b_1(t)$ and $b_2(t)$ (labeled $b_1'(t)$ and $b_2'(t)$).

Using CDMA modulation permits the system to be easily reconfigured. By making the spreading codes programmable, such that they can be changed using software commands, for example, the destination of a signal can be changed. The simple reconfigurability of the present invention represents a significant advantage over other interconnection methods. Wired interconnects require the use of physical switches to redirect a signal from one destination to another. Here, a signal's destination is changed by simply changing its modulating code, which can even be done on-the-fly.

Figure 6:
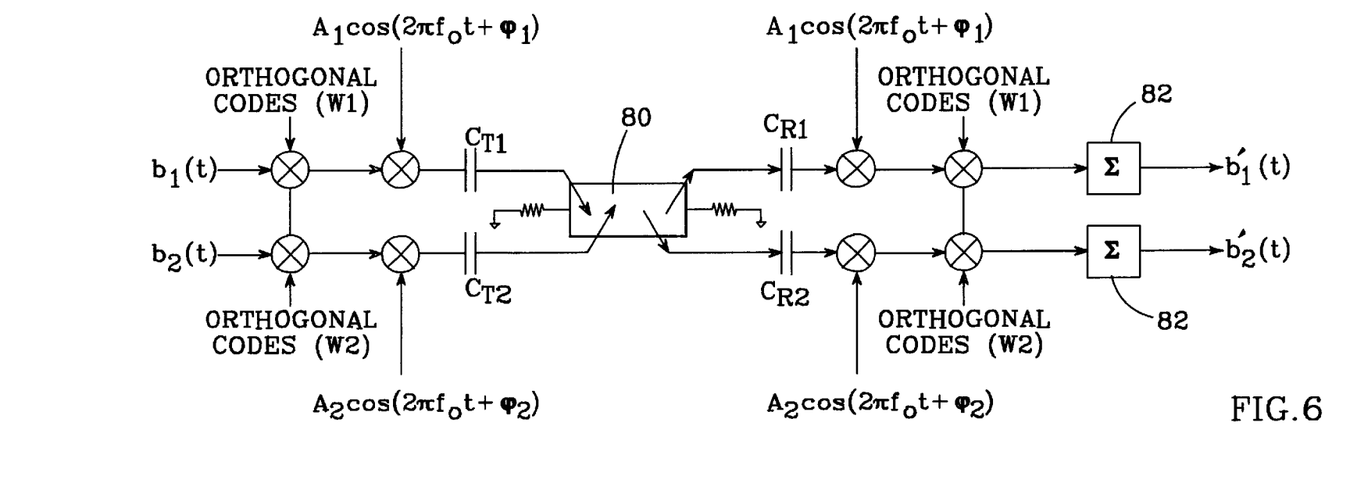
FIG. 6 is a diagram of an alternative embodiment of a wireless interconnection system which utilizes a CDMA algorithm.

A CDMA algorithm may also be used beyond the baseband by modulating CDMA-modulated signals with RF carriers, as shown in FIG. 6. Here, incoming signals $b_1(t)$ and $b_2(t)$ are spread by respective orthogonal codes such as Walsh codes W1 and W2, and modulated with RF carriers such as $A_1 \cos(2\pi f_0 t + \Phi_1)$ and $A_2 \cos(2\pi f_0 t + \Phi_2)$, before being coupled to shared wireless transmission medium 80 via capacitive couplers $C_{T1}$ and $C_{T2}$. At the receiver end, the signals are coupled from medium 80 via capacitive couplers $C_{R1}$ and $C_{R2}$, demodulated and de-spread using the same RF carriers and orthogonal codes used on the transmitter side, and fed to correlators 82 to recover $b_1(t)$ and $b_2(t)$ (labeled $b_1'(t)$ and $b_2'(t)$). In this case, both coherent demodulation and sequence timing acquisition and tracking are used for signal recovery.

Several parameters should be considered if implementing the present invention with CDMA modulation, including the number of I/Os (i.e., the system capacity), bit rate (i.e., the transmitted signal rate), and bit error rate (BER). For example, assume the transmitted power of each transmitter is well controlled and all signals are received with equal power. If the conveyed signals are modulated with orthogonal codes and the system is operated under a synchronous access condition, the total number of I/Os is limited only by the spreading factor N, as given by:

$$N = \frac{F_C}{F_S} = \frac{T_S}{T_C} = G \qquad (3)$$

where N is equivalent to the CDMA processing gain G, $F_S$ is the symbol rate (or CDMA sub-channel data rate), $F_C$ is the chip (or clock) rate of the spreading code, $T_S$ is the symbol clock period, and $T_C$ is the chip clock period; the BER of the wireless interconnect system is totally determined by the signal-to-noise ratio (SNR) of the receiver.

Simulations have been performed in which Walsh codes were chosen as the spreading code sequence, and a processing gain of 20 and synchronous access were assumed. The use of Walsh codes limits the number of I/O channels to 20. These simulations indicate that the system reaches an extremely low BER ($<10^{-14}$) as SNR >15 dB.

Figure 7A:
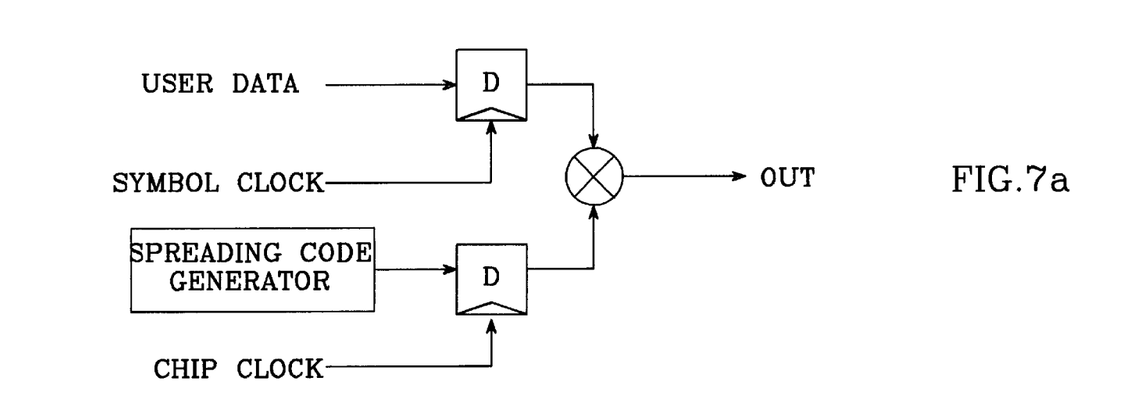
FIG. 7a is a diagram of the baseband portion of a CDMA transmitter.
Figure 7B:
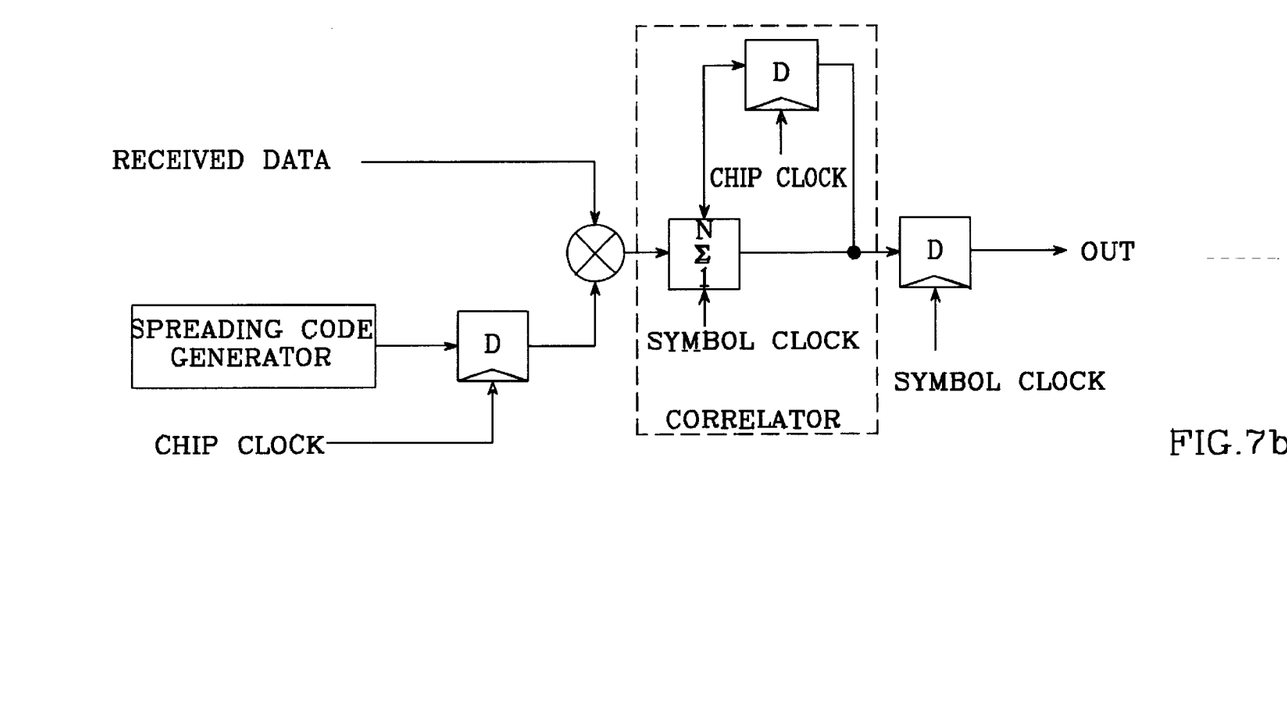
FIG. 7b is a diagram of the baseband portion of a CDMA receiver.

The baseband (digital part) of a CDMA-interconnect transceiver is shown in FIGS. 7a (transmitter side) and 7b (receiver side). As shown in FIG. 7a, user data and the spreading codes are clocked into respective D flip-flops with a symbol clock and a chip clock, respectively, and the outputs of the flip-flops are mixed and fed to either a capacitive coupler or RF modulator. In FIG. 7b, the spreading codes are clocked into a D flip-flop with the chip clock, the output of the flip-flop and the received signal (from either a capacitive coupler or RF demodulator) are mixed and fed to a correlator. The correlator output is provided to a D flip-flop clocked by the symbol clock to reconstruct the conveyed signal.

CDMA algorithms are well-known; they are described in, for example, Viterbi, *CDMA—Principles of Spread Spectrum Communication*, Addison-Wesley Longman, Inc. (1995), pp. 2–9.

The synchronous access condition is fulfilled if the signal traveling distance during one $T_C$ is larger than the longest span between any two transmitters coupled to the same shared wireless transmission medium. Assuming a data rate of 20 Gbps, the maximum synchronous access distance between any two transmitters is limited to about 0.7 cm.

In order to maintain flexibility in locating transmitters geographically and high overall data rate and spectrum efficiency of the wireless interconnect system, a FDMA/CDMA combined access system may be employed. In this system, frequency bands are divided by using different RF carriers, while I/O data are spread within individual frequency bands using orthogonal codes. For example, an FDMA algorithm may be used to divide a 100 GHz bandwidth into five 20 GHz bands, each of which holds 4 CDMA I/O sub-channels. Each sub-channel then operates at a bit rate of 5–10 Gbps, according to the modulation scheme.

Figure 8:
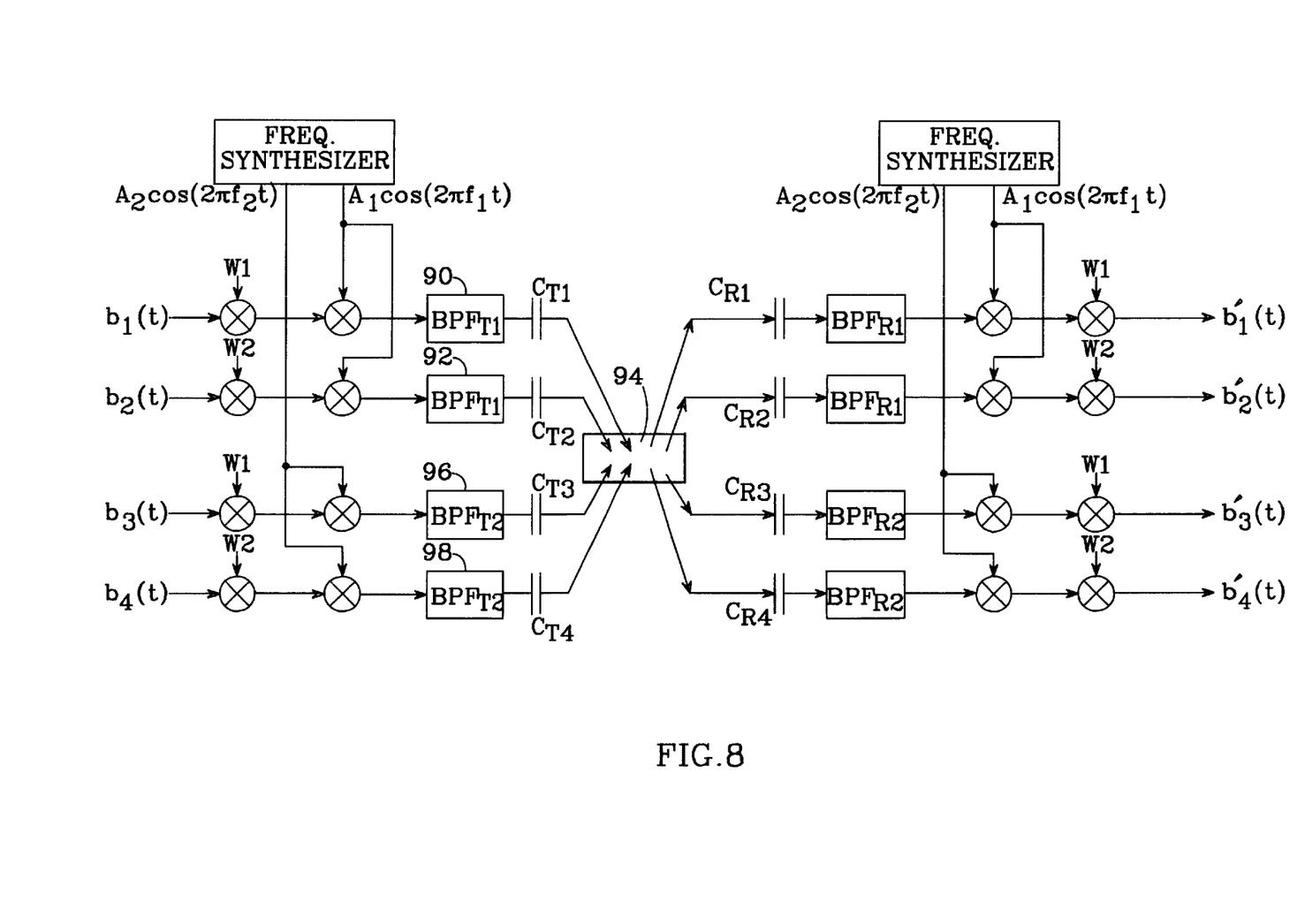
FIG. 8 is a diagram of a wireless interconnection system which utilizes both FDMA and CDMA algorithms.

An exemplary FDMA/CDMA combined access system is shown in FIG. 8. In this four input signal example, two input signals $b_1(t)$ and $b_2(t)$ are spread using respective unique orthogonal codes (W1 and W2), multiplied by a RF sinusoidal carrier (e.g., $A_1 \cos(2\pi f_1 t)$), and bandpass filtered using filters 90, 92 having a common passband, thereby allocating $b_1(t)$ and $b_2(t)$ to one frequency band. The CDMA and FDMA-modulated signals are then coupled to a shared wireless transmission medium 94 via capacitive couplers $C_{T1}$ and $C_{T2}$. Similarly, input signals $b_3(t)$ and $b_4(t)$ are spread using respective orthogonal codes (e.g., W1 and W2), multiplied by a RF carrier (e.g., $A_2 \cos(2\pi f_2 t)$), and bandpass filtered using filters 96, 98, thereby allocating $b_3(t)$ and $b_4(t)$ to a second frequency band. These signals are coupled to medium 94 via capacitive couplers $C_{T3}$ and $C_{T4}$.

On the receiver side, the propagating signals are coupled from medium 94 via capacitive couplers $C_{R1}$–$C_{R4}$, passed through respective bandpass filters and demodulated with signals $A_1 \cos(2\pi f_1 t)$ and $A_2 \cos(2\pi f_2 t)$, and de-spread with the orthogonal codes with which they were modulated, thereby providing reconstructed versions of input signals $b_1(t)$–$b_4(t)$ (labeled here as $b_1'(t)$–$b_4'(t)$).

With a FDMA/CDMA combined access system as described above, the RF transceivers may be designed to operate in each of the separate 20 GHz bands, in which case the transceiver's digital circuits are only required to clock at 20–40 Gbps within each band. Thus, this architecture provides a 100 GHz bandwidth interconnect scheme, while reducing the complexity of the transceiver and digital circuit designs. In the absence of such an arrangement, the transceivers must operate over the complete 100 GHz bandwidth, with digital circuits clocked up to 100–200 Gbps for an equivalent interconnect data throughput.

Signal-to-noise ratio considerations impose a limit on the transmission distance for signals at a given frequency. However, transmitter/receiver repeaters my be utilized if longer synchronous access distances are needed. A random or asynchronous access process should be avoided, to simplify the transmitter/receiver architecture and circuit implementation.

A wireless communication system per the present invention can be implemented using silicon-based CMOS technology. The invention may be packaged in any number of ways, including multi-chip modules (MCMs) and flip-chips. A flip-chip arrangement, for example, locates the IC dies on top and the wireless transmission medium on the bottom, with the medium bonded to the ICs via bonding pads that form respective capacitive couplers when bonded.

To reduce power consumption, clustered transmitters within the synchronous access range may share a common RF transmitter, while clustered receivers may share a common RF receiver, without sacrificing channel reconfigurability. The only non-sharable circuitry is the digital portions of the transceivers; however, the real estate and power consumption needs of these circuits are virtually insignificant when implemented using CMOS technology.

As noted above, the invention offers many advantages over conventional interconnection schemes. In addition, the invention also facilitates the non-invasive testing of dies within a package, eliminating the need to connect wire bonds to the dies.

While particular embodiments of the invention have been shown and described, numerous variations and alternate embodiments will occur to those skilled in the art.

Accordingly, it is intended that the invention be limited only in terms of the appended claims.

We claim:

1. A wireless integrated circuit (IC) interconnection system, comprising:
    a guided medium,
    a transmitter which modulates a signal to be conveyed from a first IC location to a second IC location and provides said modulated signal at an output,
    a first capacitive coupler which capacitively couples said modulated signal from said transmitter output to said wireless transmission medium,
    a second capacitive coupler which capacitively couples said modulated signal from said wireless transmission medium to a receiver, said wireless transmission medium propagating said modulated signal from said first capacitive coupler to said second capacitive coupler, and
    a receiver which demodulates said modulated signal and provides said demodulated signal to said second IC location,
    wherein said guided medium is a microstrip transmission line (MTL) having a characteristic impedance $Z_C$, said MTL terminated at both ends with an impedance equal to $Z_C$.

2. A wireless integrated circuit (IC) interconnection system, comprising:
    a guided medium,
    a transmitter which modulates a signal to be conveyed from a first IC location to a second IC location and provides said modulated signal at an output,
    a first capacitive coupler which capacitively couples said modulated signal from said transmitter output to said wireless transmission medium,
    a second capacitive coupler which capacitively couples said modulated signal from said wireless transmission medium to a receiver, said wireless transmission medium propagating said modulated signal from said first capacitive coupler to said second capacitive coupler, and
    a receiver which demodulates said modulated signal and provides said demodulated signal to said second IC location,
    wherein said guided medium is a coplanar waveguide (CPW) having a characteristic impedance $Z_C$, said CPW terminated at both ends with an impedance equal to $Z_C$.

3. A wireless integrated circuit (IC) interconnection system, comprising:
    a wireless transmission medium,
    a plurality of transmitters, each of which modulates a respective signal to be conveyed from a first IC location to a second IC location and provides said modulated signal at an output,
    a first plurality of capacitive couplers, each of which capacitively couples a respective one of said modulated signals from its respective transmitter output to said wireless transmission medium,
    a second plurality of capacitive couplers, each of which capacitively couples said modulated signals from said wireless transmission medium to a respective receiver, said wireless transmission medium propagating said modulated signals from said first plurality of capacitive couplers to said second plurality of capacitive couplers, and
    a plurality of receivers, each of which demodulates a respective one of said modulated signals and provides said demodulated signal to said second IC location,
    wherein said wireless transmission medium is a microstrip transmission line (MTL) having a characteristic impedance $Z_C$, said MTL terminated at both ends with an impedance equal to $Z_C$.

4. A wireless integrated circuit (IC) interconnection system, comprising:
    a wireless transmission medium,
    a plurality of transmitters, each of which modulates a respective signal to be conveyed from a first IC location to a second IC location and provides said modulated signal at an output,
    a first plurality of capacitive couplers, each of which capacitively couples a respective one of said modulated signals from its respective transmitter output to said wireless transmission medium,
    a second plurality of capacitive couplers, each of which capacitively couples said modulated signals from said wireless transmission medium to a respective receiver, said wireless transmission medium propagating said modulated signals from said first plurality of capacitive couplers to said second plurality of capacitive couplers, and
    a plurality of receivers, each of which demodulates a respective one of said modulated signals and provides said demodulated signal to said second IC location,
    wherein said wireless transmission medium is a coplanar waveguide (CPW) having a characteristic impedance $Z_C$, said CPW terminated at both ends with an impedance equal to $Z_C$.

5. A method of conveying a signal from a first integrated circuit (IC) location to a second IC location, comprising:
    modulating said signal from said first IC location,
    capacitively coupling said modulated signal to a guided medium,
    propagating said capacitively coupled modulated signal through said guided medium,
    capacitively coupling said propagated modulated signal from said guided medium, and
    demodulating said modulated signal capacitively coupled from said guided medium and providing said demodulated signal to said second IC location,
    wherein said guided medium is a microstrip transmission line (MTL) having a characteristic impedance $Z_C$, said MTL terminated at both ends with an impedance equal to $Z_C$.

6. A method of conveying a signal from a first integrated circuit (IC) location to a second IC location, comprising:
    modulating said signal from said first IC location,
    capacitively coupling said modulated signal to a guided medium,
    propagating said capacitively coupled modulated signal through said guided medium,
    capacitively coupling said propagated modulated signal from said guided medium, and
    demodulating said modulated signal capacitively coupled from said guided medium and providing said demodulated signal to said second IC location,
    wherein said guided medium is a coplanar waveguide (CPW) having a characteristic impedance $Z_C$, said CPW terminated at both ends with an impedance equal to $Z_C$.

7. A method of conveying a plurality of signals from respective first integrated circuit (IC) locations to respective second IC locations, comprising:

modulating each of said signals from said first IC locations, capacitively coupling each of said modulated signals to a wireless transmission medium, propagating said capacitively coupled modulated signals through said wireless transmission medium, capacitively coupling said propagated modulated signals from said wireless transmission medium, demodulating each of said modulated signals capacitively coupled from said wireless transmission medium and providing said demodulated signals to said second IC locations, wherein said wireless transmission medium is a microstrip transmission line (MTL) or a coplanar waveguide (CPW) having a characteristic impedance $Z_C$, said MTL or CPW terminated at both ends with an impedance equal to $Z_C$.

8. The method of claim 7, wherein said signals from said first IC locations are modulated and said modulated signals are demodulated with a frequency-division multiple access (FDMA) algorithm.

9. The method of claim 8, further comprising bandpass filtering each of said modulated signals prior to their being capacitively coupled to said wireless transmission medium, and bandpass filtering each of said modulated signals capacitively coupled from said wireless transmission medium prior to their being demodulated.

10. The method of claim 7, wherein said signals from said first IC locations are modulated and said modulated signals are demodulated with a code-division multiple access (CDMA) algorithm.

11. The method of claim 10, wherein each of said modulated signals has an associated programmable orthogonal address code such that the destinations of said modulated signals can be changed by reprogramming said address codes.

12. The method of claim 7, wherein said signals from said first IC locations are modulated with a frequency-division multiple access (FDMA) algorithm and a code-division multiple access (CDMA) algorithm.

13. The method of claim 12, wherein said FDMA modulation allocates said signals to be conveyed into distinct frequency bands, each of which carries multiple ones of said modulated signals, and said CDMA algorithm further modulates each of said FDMA-modulated signals within each frequency band.

14. A wireless integrated circuit (IC) interconnection system, comprising:

a guided medium, a transmitter which modulates a signal to be conveyed from a first IC location to a second IC location and provides said modulated signal at an output, a first capacitive coupler which capacitively couples said modulated signal from said transmitter output to said wireless transmission medium, a second capacitive coupler which capacitively couples said modulated signal from said wireless transmission medium to a receiver, said wireless transmission medium propagating said modulated signal from said first capacitive coupler to said second capacitive coupler, and a receiver which demodulates said modulated signal and provides said demodulated signal to said second IC location, wherein said guided medium is a microstrip transmission line (MTL) or a coplanar waveguide (CPW) having a characteristic impedance $Z_C$, said MTL or CPW terminated at both ends with an impedance equal to $Z_C$.

15. The wireless IC interconnection system of claim 14, wherein said first and second IC locations are on a common IC die such that said interconnection system provides an intra-chip interconnection.

16. The wireless IC interconnection system of claim 14, wherein said first and second IC locations are on respective IC dies such that said interconnection system provides an inter-chip interconnection.

17. The wireless IC interconnection system of claim 14, wherein said transmitter modulates said signal to be conveyed with an analog carrier.

18. The wireless IC interconnection system of claim 14, wherein said transmitter modulates said signal to be conveyed with a digital carrier.

19. A wireless integrated circuit (IC) interconnection system, comprising:

a wireless transmission medium, a plurality of transmitters, each of which modulates a respective signal to be conveyed from a first IC location to a second IC location and provides said modulated signal at an output, a first plurality of capacitive couplers, each of which capacitively couples a respective one of said modulated signals from its respective transmitter output to said wireless transmission medium, a second plurality of capacitive couplers, each of which capacitively couples said modulated signals from said wireless transmission medium to a respective receiver, said wireless transmission medium propagating said modulated signals from said first plurality of capacitive couplers to said second plurality of capacitive couplers, and a plurality of receivers, each of which demodulates a respective one of said modulated signals and provides said demodulated signal to said second IC location, wherein said wireless transmission medium is a microstrip transmission line (MTL) or a coplanar waveguide (CPW) having a characteristic impedance $Z_C$, said MTL or CPW terminated at both ends with an impedance equal to $Z_C$.

20. The wireless IC interconnection system of claim 19, wherein each of said first and second IC locations are on a common IC die such that said interconnection system provides intra-chip interconnections.

21. The wireless IC interconnection system of claim 19, wherein at least some of said first and second IC locations are on different IC dies such that said interconnection system provides inter-chip interconnections.

22. The wireless IC interconnection system of claim 19, wherein said modulated signals and said demodulated signals are modulated and demodulated with a frequency-division multiple access (FDMA) algorithm.

23. The wireless IC interconnection system of claim 22, wherein each of said transmitters includes a respective bandpass filter which is arranged to filter a respective one of said modulated signals prior to its being capacitively coupled to said wireless transmission medium, and each of said receivers includes a respective bandpass filter which is arranged to filter a respective one of said received signals prior to its being demodulated.

24. The wireless IC interconnection system of claim 19, wherein said modulated signals and said demodulated signals are modulated and demodulated with a code-division multiple access (CDMA) algorithm.

25. The wireless IC interconnection system of claim 24, wherein each of said modulated signals has an associated programmable orthogonal address code such that the destinations of said modulated signals can be changed by reprogramming said address codes.

26. The wireless IC interconnection system of claim 19, wherein said modulated signals are modulated with a frequency-division multiple access (EDMA) algorithm and a code-division multiple access (CDMA) algorithm.

27. The wireless IC interconnection system of claim 26, wherein said system is arranged such that said FDMA modulation allocates said signals to be conveyed into distinct frequency bands, each of which carries multiple ones of said modulated signals, and said CDMA algorithm further modulates each of said FDMA-modulated signals within each frequency band.

28. A method of conveying a signal from a first integrated circuit (IC) location to a second IC location, comprising:

modulating said signal from said first IC location, capacitively coupling said modulated signal to a guided medium, propagating said capacitively coupled modulated signal through said guided medium, capacitively coupling said propagated modulated signal from said guided medium, and demodulating said modulated signal capacitively coupled from said guided medium and providing said demodulated signal to said second IC location, wherein said guided medium is a microstrip transmission line (MTL) or a coplanar waveguide (CPW) having a characteristic impedance $Z_C$, said MTL or CPW terminated at both ends with an impedance equal to $Z_C$.

29. The method of claim 28, wherein said first and second IC locations are on a common IC die such that said method provides an intra-chip interconnection.

30. The method of claim 28, wherein said first and second IC locations are on respective IC dies such that said method provides an inter-chip interconnection.

31. The method of claim 28, wherein said modulating comprises mixing said signal from said first IC location with an analog carrier.

32. The method of claim 28, wherein said modulating comprises mixing said signal from said first IC location with a digital carrier.

* * * * *